June 17, 1958 J. P. HOBART 2,839,319
ROD CLAMP
Filed Sept. 19, 1955
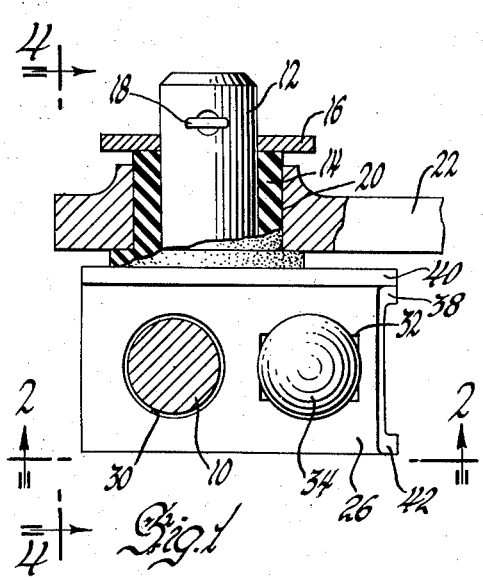
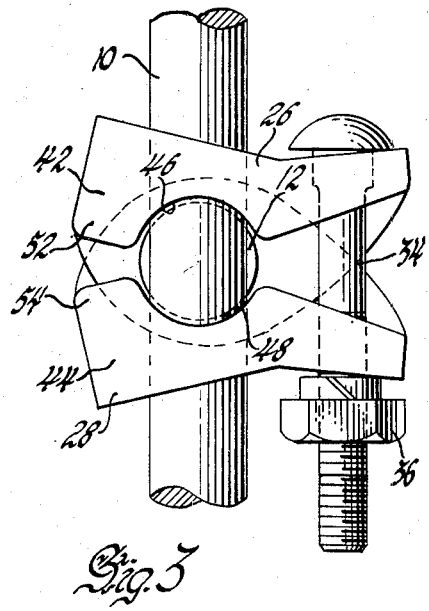
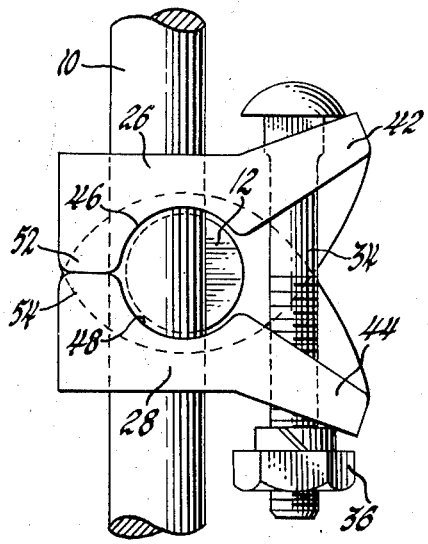
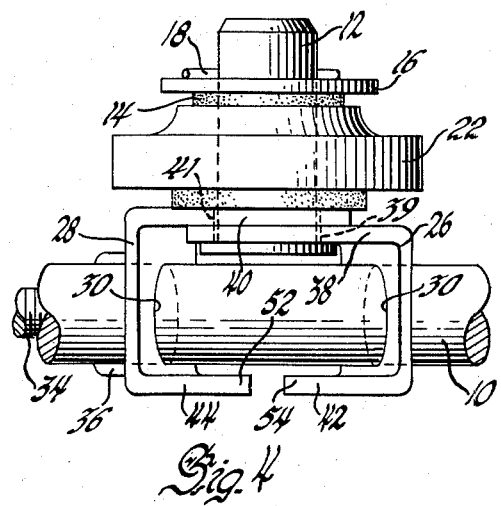
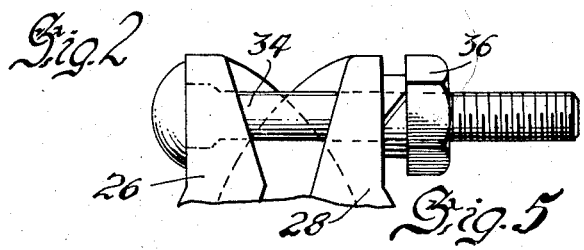
INVENTOR.
John P. Hobart
BY
T. R. Chisholm
ATTORNEY

United States Patent Office 2,839,319
Patented June 17, 1958

2,839,319

ROD CLAMP

John P. Hobart, Birmingham, Mich., assignor to General Motors Corporation, Detroit, Mich., a corporation of Delaware Application September 19, 1955, Serial No. 534,996

10 Claims. (Cl. 287—3)

This invention relates to a clamp and more particularly to an adjustable clamp for attaching a pivot pin to a rod.

The clamp is employed to attach a pivot pin to a rod to provide a pivotal connection between a rod and a lever. The clamp has two channel members each having a wide flange with an aperture and a pivot pin extending through the apertures in the wide flanges. The pivot pin thus pivotally secures the channel members together and pivots the clamp on the lever. When the channel members are in the free position, abutment portions of the narrow flanges, located opposite the wide flanges, will abut to align the apertures in the base of the channel members so that the rod may slide through the apertures. The clamp bolt is then slipped through slots in the ends of the members and tightened to rotate the members and securely grip the rod.

An object of the invention is to provide a compact low-cost, lightweight pivot pin and clamp formed of two stamped channel members having apertured flanges at one side receiving the pivot pin to pivotally secure the members together and to provide a mounting for the clamp.

Another object of the invention is to provide a clamp having two members pivotally secured together by a pin where each member has a flange having an abutment portion limiting rotation of the clamp members in the position in which the apertures are in alignment to receive a rod.

Another object of the invention is to provide a low-cost sheet metal clamp, a pair of members having apertured flanges overlapping at one side and a pivot pin extending through the flanges to pivotally secure the members together and abutment flanges engaging each other at the other side to position the clamp members when in disengaged position so that the rod apertures are in axial alignment.

Another object of the invention is to provide in a rod clamp a pair of channel members having one flange extended to provide apertured projections at one side extending in overlapping relation with a pin extending through the apertures to pivotally secure the parts together and to pivotally connect the clamp to a lever and the other flange having abutting projections to align the apertures for the insertion of the rod and recesses in said other flange to permit insertion of the pin.

These and other objects and advantages of the invention will be more apparent from the following description and drawing illustrating the preferred embodiment.

Fig. 1 is an elevation view of the clamp in released position with parts broken away and in section to show details.

Fig. 2 is a bottom plan view of Fig. 1 on the line 2—2 showing the clamp in released position.

Fig. 3 is a view similar to Fig. 2 showing the clamp in the engaged position.

Fig. 4 is a view of Fig. 1 along the line 4—4.

Fig. 5 shows a portion of a modified clamp.

The shift rod clamp provides an adjustable mounting on a rod 10 for a pivot pin 12 which is pivotally mounted by a suitable rubber bushing 14, washer 16 and securing means such as a cotter pin 18 in an aperture 20 in the lever 22. The shift rod adjusting clamp has a narrow channel member 26 and the wide channel member 28. Each of the channel members has a base, a wide apertured flange 38 and 40 and a narrow abutment flange 42 and 44. The base of each channel member has an aperture 30 adjacent the one end for the shift rod 10 and a slot 32 adjacent the other end for the carriage bolt 34 which has a suitable nut and lock washer 36. Each of the channel members 26 and 28 is bent between the aperture 30 and slot 32 so that the base of the channel has two flat portions, one, a clamp engaging portion, surrounding an aperture 30 and the other, an actuating portion, surrounding a slot 32.

The channel-shaped member 26 has at one side a wide flange 38 having an aperture 39 fitting inside the apertured (41) wide flange 40 which is formed on the wide channel member 28. As best shown in Fig. 4, the channel members are assembled with the flanges facing each other and wide flanges 38 and 40 in overlapping relation and the narrow flanges 42 and 44 in alignment. The pivot pin 12 fits through the apertures in the wide flange 38 and 40 to pivotally secure the members 26 and 28 together. Since the clamping action is more effective if the channel members have free movement, the pin 12 has considerable clearance in the apertures in the wide flanges 38 and 40. The other side of the narrow channel member 26 has a narrow flange 42 in alignment with a similar narrow flange 44 on the wide channel member 28. In order to insert the pivot pin in the apertures in the wide flanges, an opening is formed between the narrow or aligned flanges by the recesses 46 and 48 in the flanges 42 and 44 respectively to permit the head of pin 12 to pass. The flanges 42 and 44 also have facing abutment surfaces 52 and 54 which are parallel to the base of their respective channel member about the apertures 30 to limit pivotal movement of the members when the clamp engaging portions are parallel so that the rod may be inserted in the apertures 30.

In Fig. 2 the clamp is illustrated in the released position with the bolt 34 open to permit the clamp members 26 and 28 to be rotated to the released position where the abutment portions 52 and 54 of the flanges 42 and 44 respectively abut to position the clamp members 26 and 28 in alignment with the apertures 30 positioned to receive the rod 10. Since the square shoulder of the carriage bolt 34 fits into the slot 32 in either member, the bolt may be inserted either way and the clamp may be tightened by merely turning nut 36 to rotate the clamping members from the position shown in Fig. 2 to the position shown in Fig. 3 where the edges of the apertures 30 grip the rod 10 to prevent movement of the clamp along the rod and thus position the pivot pin 12 firmly on the rod. The clearance of the members on pin 12 provides sufficient clearance to insure proper clamping action without undue strain at the pivot. When the rod is clamped as shown in Fig. 3, the center line of the pivot pin 12 intersects the center line of the rod 10 at right angles. The channel members are preferably bent so that in the clamped position the actuating portions are parallel and the clamping bolt will seat flat against the base of the actuating portions of the channel members as illustrated in Fig. 5, the other features being the same.

Though the above described embodiment of the clamp is illustrative of the invention, it will be apparent to those skilled in the art that other modifications may be made within the scope of the appended claims.

I claim:

1. In a rod clamp, a first channel member having a wide flange, a second channel member having a wide flange, said members being positioned with the wide flanges facing each other and having portions in overlapping relation, said overlapping flange portions having aligned pivot apertures, a pin extending through said pivot apertures to provide a pivotal mounting for the clamp, a rod aperture in the base of each of the channel members providing a pair of aligned rod apertures to freely receive a rod when said channel members are at right angles to the rod, and means to rotate said members to a gripping position to grip the rod.

2. In a rod clamp, a wide channel member having a wide flange and a narrow flange, a narrow channel member having a wide flange and a narrow flange, said members having portions positioned with the wide flanges facing each other and being in overlapping relation and the narrow flanges facing each other and being adapted to abut, said overlapping flange portions having aligned pivot apertures, a pin extending through said pivot apertures to pivotally secure the members together and to provide a pivotal mounting for the clamp, a rod aperture in the base of each of the channel members located to provide a pair of aligned rod apertures to freely receive a rod when said channel members are parallel to each other and at right angles to the rod, said narrow flanges having abutment portions abutting when said channel members are parallel to each other, and means to rotate said members to grip the rod.

3. In a rod clamp, a wide channel member having a wide flange and a narrow flange, a narrow channel member having a wide flange and a narrow flange, said members being positioned with the wide flanges facing each other and having portions in overlapping relation and the narrow flanges facing each other and being adapted to abut, said overlapping flange portions having aligned pivot apertures, a pin having a head located between the wide and narrow flanges and extending through said aligned pivot apertures to provide a pivotal mounting for the clamp, said narrow flanges having opposed recesses adapted to provide an opening opposite said aligned pivot apertures to permit passage of the head of said pin, a rod aperture located in the base of each of the channel members to provide a pair of aligned rod apertures on opposite sides of said aligned pivot apertures and spaced from said wide flange a distance greater than the thickness of the head of said pin to freely receive a rod when said channel members are at right angles to the rod, and means to rotate said members to grip the rod.

4. In a rod clamp, a wide channel member having a wide flange and a narrow flange, a narrow channel member having a wide flange and a narrow flange, said members being positioned with the wide flanges facing each other and having portions in overlapping relation and the narrow flanges facing each other and being adapted to abut, said overlapping flange portions having aligned pivot apertures, a pin having a head located between the wide and narrow flanges and extending through said pivot apertures to pivotally connect said members and to provide a pivotal mounting for the clamp, said narrow flanges having opposed recesses providing an opening opposite said apertures adapted to permit passage of the head of said pin, a rod aperture located in a first portion of each of the base of said channel members to provide a pair of aligned rod apertures located on opposite sides of said pivot apertures and spaced from said wide flange a distance greater than the thickness of the head of said pin, to freely receive a rod when said channel members are in a first position substantially parallel to each other, abutment means on said narrow flanges limiting pivotal movement of said members in one direction in said first position, each of said members having an actuating portion disposed at an angle to said first portion, and securing means to rotate said members in the other direction to grip the rod when said actuating portions are substantially parallel to each other to provide parallel seats for said securing means.

5. The invention defined in claim 1 and the axis of said pin substantially intersecting the centerline of said aligned rod apertures when said members are in said gripping position.

6. In a rod clamp, a first clamp member, a second clamp member, means to pivot said clamp members together for relative pivotal movement about an axis between an open and a closed position and to prevent relative transverse movement at the axis, each of said members having a portion having an aperture, said apertures being aligned to receive a rod throughout said range of movement, said members in said open position locating said apertures to freely receive a rod and said members in said closed position locating said apertures to clamp said rod, abutment means on said clamp members to limit opening pivotal movement of said members at said open position in which said apertures freely receive a rod and to prevent further movement beyond said open position, said members being rotatable from said open position to said closed position to clamp said rod preventing movement beyond said closed position, and means to secure said clamp members in said closed position to clamp the rod.

7. In a clamp for clamping a rod to an element, a clamp assembly including a first clamp member, a second clamp member and a pivot member connecting said clamp members together for free pivotal movement about an axis between an open and a closed position, said pivot member being provided for connecting said clamp assembly to an element, each of said clamp portions having an aperture, said apertures being transversely aligned on an axis substantially intersecting the pivot member axis when the clamp members are in the closed position, said apertures being located to freely receive said rod in said open position and to clamp said rod in said closed position with said rod having its axis substantially intersecting the axis of said pivot member provided for connecting said clamp assembly to an element, and means to secure said clamp members in said closed position to clamp said rod.

8. In a rod clamp, a first clamp member, a second clamp member, each of said members having a clamping portion having an aperture and a flat actuating portion, means to pivot said clamp members together with said clamping portions facing each other and the apertures aligned and said actuating portions facing each other and for relative pivotal movement between an open position and a closed position, each of said members having its clamping portion and its actuating portion located at such an angle to each other that in said open position said clamping portions are substantially parallel and said apertures aligned to freely receive a rod and said actuating portions are at an angle to each other and in said closed position said actuating portions are substantially parallel to each other and said clamping portions are at an angle to each other to clamp a rod passing through the apertures, and securing means engaging said actuating portions to secure said clamp members in said closed position having parallel flat engaging portions in surface engagement with the parallel flat actuating portions of said clamp members in said closed position.

9. The invention defined in claim 8 and said clamping members having abutment means limiting pivotal movement in a direction from said closed position to said open position at said open position and preventing pivotal movement in said direction beyond said open position.

10. In a rod clamp, a first clamp member, a second clamp member, pivot means securing said clamp members together for pivotal movement about an axis between an open position and a closed position, each of said clamping members having a first surface portion parallel to said axis and having an aperture, the apertures being aligned to receive a rod in all positions, said first surface portion of said clamp members being substantially parallel in said open position to freely receive a rod and angularly related in said closed position to clamp the rod, each of said clamp members having a second flat surface portion parallel to said axis having a hole therein, the holes being aligned, said second surface portion of each member being located at such angle to said first surface portion of said each member that said second surface portions are angularly related to each other in said open position when said first surface portions are parallel to each other and said second surface portions are parallel to each other in said closed position when said first surface portions are angularly related to clamp the rod, securing means extending through said holes and having parallel seat portions adjustably movable together from a first position angularly engaging said second surface portions of said clamp members when angularly related in said open position to a second position flatly engaging said second surface portions when parallel to each other in said closed position of said clamp members.

References Cited in the file of this patent

UNITED STATES PATENTS

| | | |
|---|---|---|
| 545,080 | Leppert | Aug. 27, 1895 |
| 1,508,190 | Ledbetter | Sept. 9, 1924 |
| 1,737,543 | Mason | Nov. 26, 1929 |
| 2,090,550 | Philblad | Aug. 17, 1937 |
| 2,458,808 | Turnbull | Jan. 11, 1949 |
| 2,711,566 | Peterson | June 28, 1955 |

FOREIGN PATENTS

| | | |
|---|---|---|
| 1,006,841 | France | Apr. 28, 1952 |